INVENTORS
GEOFFREY BATE
ANTON G. WELLBROCK

BY Donald W. Margoli

ATTORNEY

Feb. 23, 1971    G. BATE ET AL    3,565,514

LIGHT DEFLECTOR SYSTEM

Filed Nov. 15, 1969    2 Sheets-Sheet 2

United States Patent Office 3,565,514
Patented Feb. 23, 1971

3,565,514
LIGHT DEFLECTOR SYSTEM
Geoffrey Bate and Anton G. Wellbrock, Boulder, Colo., assignors to International Business Machines Corporation, Armonk, N.Y., a corporation of New York
Filed Nov. 15, 1968, Ser. No. 776,056
Int. Cl. G02f 1/28, 1/36
U.S. Cl. 350—285    7 Claims

ABSTRACT OF THE DISCLOSURE

A light deflector system is provided wherein a light beam can be quickly positioned in response to a relatively small magnetic, mechanical, or electric signal, thereby enabling the precise positioning of the beam to preselected locations.

BACKGROUND OF THE INVENTION

(1) Field of the invention

This invention relates to light deflectors in general and, more particularly, to light deflectors specifically adapted to deflect or focus a beam selectively along preselected paths to preselected locations. While not limited to this use, the invention is particularly adapted for digitally offsetting a light beam along spaced parallel paths so that it can be focussed, for example, on a memory element or record media to record or read information on the element. Similarly, it may be used in any embodiment in which precise and controlled positioning of a light beam is desired; for example, in a character generation system.

Thus, the primary object of this invention is to adjust quickly and control accurately both the path taken by, and the final positioning of, a light beam.

(2) Summary of the invention

The light deflector of this invention includes two light transmitting elements and means for moving them in and out of contact abutting relationship with one another. The first element is a light transparent member which is positioned to receive a beam of light and has a boundary surface oriented to intercept the beam at an angle equal to or greater than the critical angle. The boundary surface serves the function of reflecting such intercepted light back into the member by the principle of total internal reflection. The second member is a reflective cell which is positioned in juxtaposition to the first transparent member. The cell is composed of a transparent plate, preferably of low mass; and a reflective backing member from which the plate is physically separated. The cavity between the transparent plate and the reflective backing member defines a chamber which is filled with a light transparent fluid having a refractive index substantially the same as the refractive index of the transparent plate. The transparent plate portion of the cell is constructed and positioned so that it is movable in and out of abutting relationship wtih the light reflecting boundary surface of the first transparent member. When the movable transparent plate is brought into abutting relationship with the reflecting boundary surface of the first light transparent member, light, rather than being reflected within the first member, can pass on into the transparent plate of the cell, and then continue on into the transparent liquid until it is reflected back towards the first member by the reflecting surface of the reflecting backing member. Thus, a beam of light which would normally be reflected to a given position by the boundary surface of the first transparent member may be offset from this position by a distance which is related to the total thickness of both the transparent plate and the inter-gap thickness of the transparent liquid in the cell. This arrangement thus offers the advantage of providing light deflectors of varying degrees in which the moving transparent member may be maintained at a constant or minimal thickness, preferably of low mass, while the effective thickness of the transparent liquid is varied.

BRIEF DESCRIPTION OF THE DRAWINGS

The foregoing and other features and advantages of the invention will be apparent from the following more particular description of the preferred embodiments of the invention, as illustrated in the accompanying drawings, in which.

DESCRIPTION OF THE PREFERRED EMBODIMENTS

It is a well-known corollary of Snell's law that almost total internal reflection of light occurs at the boundary surface of a material having a given index of refraction when the boundary surface is adjacent a material having a lower index of refraction and when the angle of incidence of the light with the boundary surface is equal to or greater than the critical angle. Exemplifying this is the situation in which light enters one of the right angle faces of a right angle prism having its hypotenuse face in, for example, air or vacuum. The light is totally reflected at the internal boundary surface of the hypotenuse. This phenomenon remains constant so long as there is an absence of material within approximately two wavelengths of light distance from the hypotenuse. When, however, material having a higher index of refraction than air or vacuum is brought into abutting relationship with the hypotenuse surface, the light approaching the hypotenuse surface from the internal side of the prism will pass from the prism. This latter phenomenon is generally termed "frustrated total internal reflection." When the material brought into abutting relationship with the prism is transparent material of similar refractive index to the prism, the light approaching the hypotenuse surface will pass on into the second transparent medium in a substantially straight path.

These principles have been used in light modulating and deflecting systems in the past. U.S. Pat. 2,565,514, "Radiation Intensity Modulator," by Wolf S. Pajes, describes a device wherein the separation between a first transparent element and a second transparent element is controlled by a piezo-electric crystal. The second element is in the fringing field generated by the light which would generally be totally reflected at the boundary of the first element, but for the presence of the second element. By mechanically moving the first and second elements relative to one another, the degree of frustration is changed, thereby modulating the amount of light that is reflected at the boundary of the first element. Also depending upon the principle of frustrated total internal reflection is U.S. Pat. 2,997,922, "Light Valve," by Edward K. Kaprelian, in which a prism light valve is constructed wherein light is normally reflected back into a prism by total internal reflection at a hypotenuse face. However, when a second prism hypotenuse is brought into contact with the hypotenuse face of the first prism, light can pass through the first prism hypotenuse and on through the second prism. U.S. patent application S.N. 680,805, "Light Deflector System," by Melbourne E. Rabedeau, now U.S. Pat. 3,514,183 and assigned to the assignee of this application, discloses a light deflector system quite similar in function to the system of the present invention, with the exception that the cell member is a solid mass including no liquid.

Figure 1:
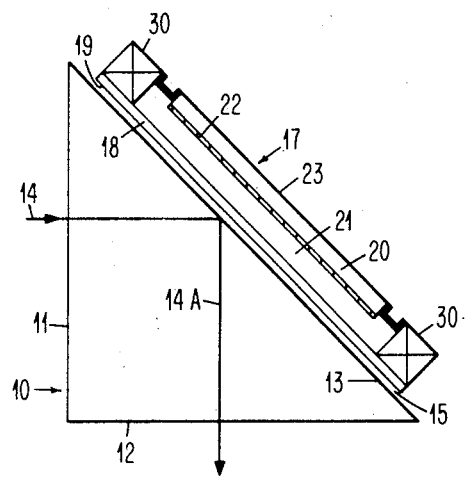
FIG. 1 is an exaggerated diagrammatic view of a single stage light deflector embodying the subject invention.

In FIG. 1 is shown an embodiment of the present invention employing the total internal reflection principle wherein a first light transparent member in the form of a right angle prism 10 having right angle surfaces 11 and 12 and a hypotenuse surface 13 is positioned to receive a ray of light 14 through face 11. As shown in FIG. 1 and described in the prior art, light 14 will be reflected off hypotenuse surface 13 if some material having an index of refraction substantially lower than that of the prism is present in space 15 external to hypotenuse surface 13 where it intercepts ray 14. The dimensions of space 15 are exaggerated for the purpose of illustration. The actual spacing between the members need only be on the order of two wavelengths of light, or about 1,200 A. In the preferred embodiment, the space around the hypotenuse of the prism is either evacuated or filled with air. Thus, as shown in FIG. 1, in which no material having a relatively high index of refraction is in area 15 of the fringing field of light at the hypotenuse, light will be reflected almost totally along path 14A. The reflection of the beam is due to the principle of total internal reflection previously described and occurs because the angle at which the light strikes the surface 13 is equal to or greater than the critical angle for the prism material.

Positioned external to the hypotenuse surface 13 of the prism is a light transparent reflective cell 17. The cell includes a transparent plate 18 which is capable of having its surface 19 moved into contact with hypotenuse surface 13 at its point of intersection with light 14. Spaced from plate 18 is reflecting backing member 20. In the cavity defined by the cell between plate 18 and backing member 20 is a transparent fluid 21 having a refractive index substantially the same as the refractive index of plate 18. Plate 18 has a refractive index which is substantially the same as the refractive index of prism 10.

Figure 2:
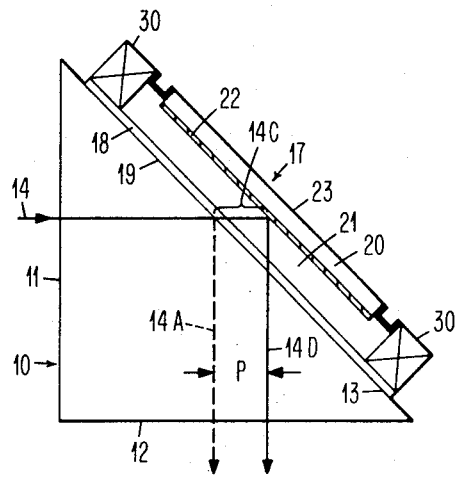
FIG. 2 shows the deflector of FIG. 1 activated to a second state.

As shown in FIG. 2, with glass plate 18 activated to place surface 19 in contact with hypotenuse surface 13 of the prism, the index of refraction of the material external to the hypotenuse surface is no longer substantially lower than the index of refraction of the prism. Thus, the total internal reflection in the prism is frustrated, and beam 14 can pass external to hypotenuse surface 13 of right-angle prism 10 along path 14C, through plate 18 and fluid 21. As the light strikes the reflective surface 22, of backing member 20, the beam is reflected along path 14D through the prism. This reflection of the beam makes it possible to digitally offset the path of beam 14D a distance P from beam 14A by the actuation of plate 18.

Reflecting surface 22 can be formed on backing member 20 by coating its surface with a reflective coating, as shown. Alternatively, reflection can be accomplished by the total internal reflection of light principle if backing member 20 is a transparent material having an index of refraction similar to fluid 21, and its outer surface 23 is in contact with a material of lower index of refraction. In the case where reflective backing member 21 is transparent, light will travel through it until it is reflected. This additional light path through member 21 would, of course, affect the degree to which the light is deflected.

In FIG. 2, it can be seen that the beam is reflected from reflective surface 22 along path 14D. Due to the similar indices of refraction of liquid 21, plate 18 and right-angle prism 10, the light will pass in a substantially straight line through these elements and from prism surface 12 in a path substantially parallel to undeflected beam 14A. Thus, the position of the beam is offset from original path 14A by a distance P, which distance is a function of the length of the light-beam path as the beam passes from prism hypotenuse surface 13 and through plate 18 and fluid 21 to reflecting surface 22. By varying this distance the degree of deflection, P, can be changed. The distance of the path length can be varied by several alternative methods. One method of accomplishing this is by varying the thickness of plate 18 similar to the method taught by patent application S.N. 680,805. This method of varying the length of light path 14C is not always preferred since it results in causing plate 18 to have an increase in mass. Such an increase in the mass of plate 18 results in an increase in the inertia and stiffness of plate 18, thus requiring more time and power to move or flex the plate.

Figure 3:
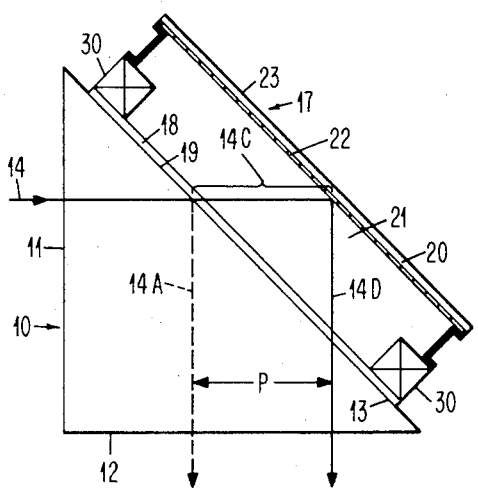
FIG. 3 is an exaggerated diagrammatic view of a deflector, similar to FIG. 1, in which the degree of deflection is controlled by the thickness of the liquid.

One preferred method of this invention for varying the distance of light path 14C is shown in FIG. 3, in which corresponding elements have been given the same reference characters as in FIGS. 1 and 2. In this embodiment the distance of light path 14C has been varied by increasing the distance between plate 18 and backing member 20 so that the thickness of fluid 21 through which the light beam must pass is increased. This increase results in a concomitant increase in the amount of offset, P.

Figure 4:
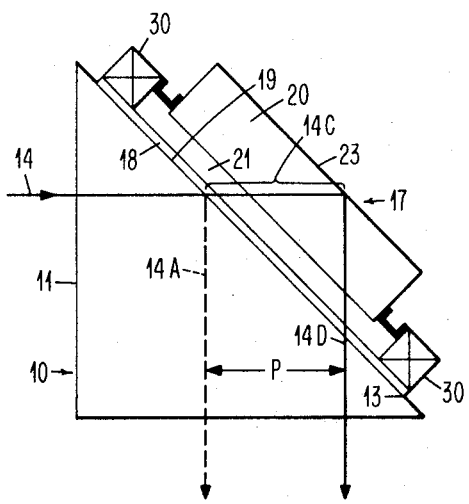
FIG. 4 is an exaggerated diagrammatic view of another embodiment of the present invention wherein the degree of deflection is controlled by the thickness of both the liquid and a transparent backing plate.

Another possible embodiment for varying the distance of light path 14C is shown in FIG. 4. While the corresponding elements have been given the same reference characters as in the previous figures, the construction of the embodiment shown in FIG. 4 varies slightly from that of the previous configurations. In FIG. 4 plate 18 of reflective cell 17 is shown as being in contact with the first transparent member so that light 14 can pass from prism 10 to cell 17. In this embodiment the distance of light path 14C has been modified not only by adjusting the path length of the light through transparent fluid 21, but also by the use of a reflective backing member 20 in the form of a transparent plate having a refractive index substantially the same as fluid 21. In such an embodiment light is reflected from the outer surface 23 of backing member 20 by the principle of total internal reflection. Of course, even in this embodiment, an additional reflecting layer could be coated on surface 23 to enhance its reflectivity. In all other respects, the embodiment of FIG. 4 operates under essentially the same principles and achieves the same results as the embodiments shown in FIGS. 1–3.

From the foregoing, it is apparent that in the embodiments shown, by movement of surface 19 of transparent plate 18 away from the point of intersection between light beam 14 and the boundary surface of the first transparent member by a distance on the order of two wavelengths of light, beam 14 will be reflected along path 14A. Actuation of transparent plate 18 until it abuts the point of intersection of beam 14 and the boundary surface of the first transparent member will cause the beam to pass on into reflective cell 17 and thereafter be reflected along path 14D, as shown in the drawings.

In accordance with the present invention, plate 18 may be actuated from a position spaced from the first transparent member to a position abutting the first transparent member in response to any suitable means. For example, transparent plate 18 may be piezo-electric material, which is caused to move in and out of contact with the first transparent member in much the same manner as the system taught by U.S. Pat. 2,565,514, referred to above. Similarly, translation of plate 18 may be accomplished by magnetostrictive phenomena as is taught in U.S. Pat. 2,997,922, referred to above. Additionally, other well-known schemes of piezo-electric and magnetostrictive translation may be employed to physically translate plate 18 in its entirety in and out of contact with first transparent member 10 or to cause the plate to expand, contract, or bow so that contact with the first transparent member may be selectively made or broken. Alternatively, mechanical or magnetic methods of causing translation, compression, expansion or bowing of plate 18 may be resorted to where electronic speeds are not required. These various motive forces have been designated generally as 30 and remain largely a matter of choice. Regardless of the motive force chosen, the present invention assures rapid response with a minimum of energy input, regardless of the degree of deflection of bowing required, due to the fact that plate 18 may be kept exceedingly thin, thereby having minimum mass and maximum flexibility.

Where the actuating mechanism 30 is electronic in nature, the actuating time is on the order of a few microseconds. Thus, the switching of the beam is substantially instantaneous. With a movement of plate 18 between the positions indicated, for example, in FIG. 1 and FIG. 2, the beam reflection path shifts, respectively, from that shown as 14A to that shown as 14D. In this manner, the position of the beam is rapidly digitally offset in response to a signal at motive member 30.

Figure 5:
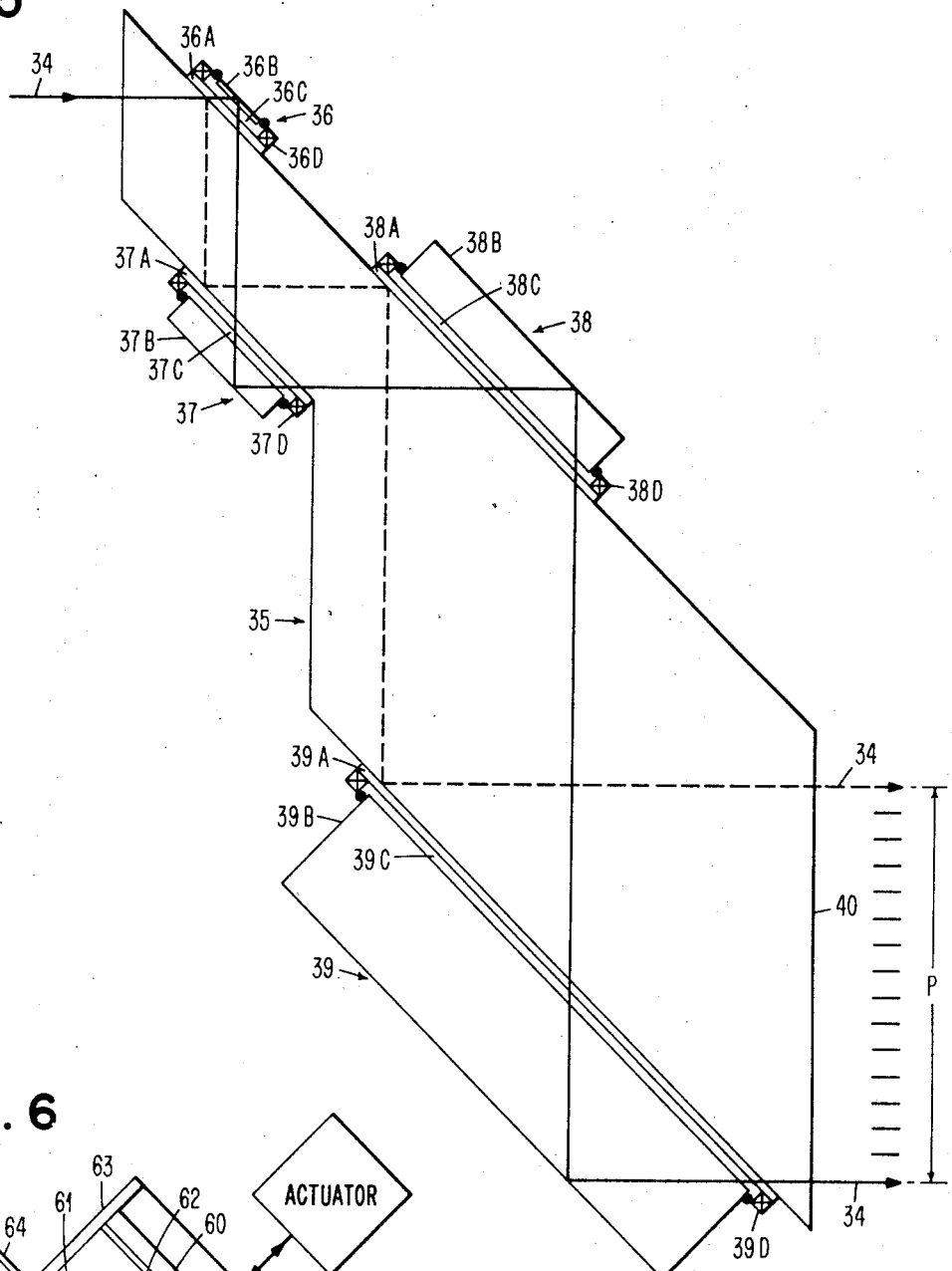
FIG. 5 is an exaggerated diagrammatic view of a multiple stage deflector embodying the present invention.

A further embodiment of the present invention is shown in FIG. 5, wherein a beam of light 34 can be selectively positioned to traverse a multitude of different paths and position the beam at any one of sixteen positions. In this embodiment beam 34 is passed through non-planar transparent body 35. A series of reflective cells 36, 37, 38, and 39 are positioned about the various boundary surfaces of non-planar body 35 at points which normally intersect beam 34 as it is reflected within the body. Each of the cells, respectively, includes a transparent plate 36A, 37A, 38A, and 39A; a reflecting backing member 36B, 37B, 38B and 39B separated from the transparent plate; suitable transparent fluid 36C, 37C, 38C, and 39C in the cavity formed between each transparent plate and the reflective backing member and motive means 36D, 37D, 38D, and 39D to actuate the transparent plates into and out of contact with non-planar body 35. Thus, as shown by the solid and dotted line representations of beam 34, the use of four reflective cell members 36, 37, 38, and 39 positioned on the points of intersection between the surface of body 35 and the beam will provide the capability of offsetting the beam to any of sixteen positions where it exits body 35 at surface 40. The maximum deflection obtained is represented by the distance P in FIG. 5. Of course, any incremental distance between any of the final sixteen positions of the light can also be obtained as a deflection.

By energizing various combinations of reflecting cell members a beam of light is permitted to be selectively reflected from either the boundary surface of body 35 or from the adjacent reflecting surface of each of the reflecting cell members. The distance the beam is offset at each cell, which is in abutting contact with body 35, is a function of the total thickness of the transparent plate, the transparent fluid, and, in the case shown, the transparent backing member. In the embodiment shown, each reflective cell is constructed to have an effective thickness which is greater than the immediately preceeding cell by a given multiple, such as two. By utilizing such an arrangement, an equal incremental digital spacing between the exiting beam positions can be achieved.

In such an embodiment as shown in FIG. 5, the total number of positions to which the beam can be deflected is calculated by the formula $2^n$ where $n$ is the number of individually actuatable reflective cell members positioned to intercept the beam at the surface of the non-planar body. While the deflection of the beam is shown in but one plane, controlled deflection of a beam can be achieved in other planes by the proper positioning of the surfaces of the non-planar body that intersect the beam. Naturally, the actuation of each reflective cell member can be by any suitable means, as described hereinabove.

Figure 6:
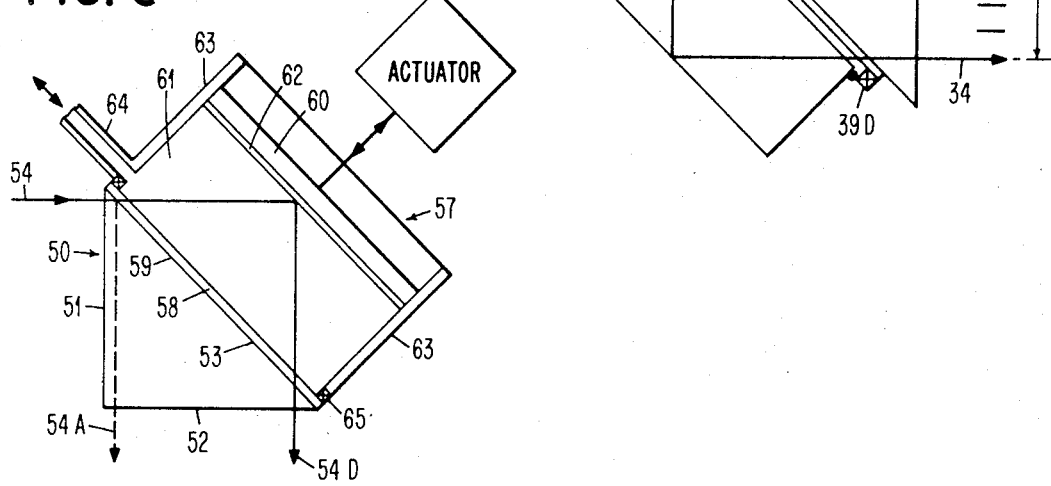
FIG. 6 is an exaggerated diagrammatic view of yet another embodiment of the present invention in which the degree of deflection can be continuously varied.

Still another embodiment of the invention is shown in FIG. 6, wherein a single deflector apparatus is capable of deflecting a beam of light along a multitude of different paths to a multitude of different positions in either an incremental or a continuous fashion. The apparatus consists of a light transparent member 50 in the form of a right-angle prism having right-angle surfaces 51 and 52 and a hypotenuse surface 53 positioned to receive a beam of light 54 through face 51. As shown in FIG. 6, with reflecting cell member 57 in abutting relationship with the prism, light beam 54 will pass from prism 50 through movable transparent plate 58 which has its surface 59 in abutting relationship with hypotenuse surface 53 of the prism. The light will then pass through transparent fluid 61 to reflective backing member 60. The beam is reflected from reflecting surface 62 through transparent fluid 61 and transparent plate 58, and then through prism 50 to exit from surface 52. The construction of this embodiment differs from the construtcion of the previous embodiments in that reflecting backing member 60 is continuously movable toward and away from transparent plate 58 within enclosure walls 63 of the cell. This arrangement allows a single reflective cell to be adjusted to give varying degrees of deflection. The amount of deflection may be fixedly set for each usage or may be varied from time to time in response to an external actuator signal. In view of the relatively large volume change contemplated within reflective cell member 57, an inlet-outlet means 64 operatively connects the fluid within member 57 to suitable pumping and reservoir means, not shown. This latter arrangement may also be utilized to hydraulically position reflective backing member 60. As in the previously described embodiments, a motive means 65 serevs to actuate transparent plate 58 into and out of contact with transparent member 50.

While this embodiment is shown in only one extreme position in FIG. 6, it is clear that as reflecting backing member 60 is moved toward and away from transparent plate 58 the degree of deflection of beam 54 will be varied.

With the exception of the embodiment of this invention shown in FIG. 6, the volume change within each reflective cell due to the movement of the transparent plate is so slight as to be negligible and not require special pumping or reservoir means. For example, with a cell having a transparent plate of one-square inch internal surface area, which plate is totally translated within the cell for a distance of two wavelengths of light, the volume change within the cell is insignificant. In such a case, taking light having a wavelength of 6,000 A., which is the mid-range of the visible spectrum, the total volume change would be about $7.8 \times 10^{-4}$ cc. The reflective cell can be easily constructed so that this slight amount of volume variation could be accommodated within the non-optically active portion of the cell by adjusting the ratio of fluid to cell or by constructing a small internal reservoir system within the cell.

While visible light having a wavelength of 6,000 A. has been mentioned with regard to this invention, it should be appreciated that the light source utilized need not be limited to a narrow band of wave-lengths so long as the space between the first transparent member and the reflective cell is sufficient to accommodate the longest wavelength without unwanted frustration. The term "light," as used herein, is, of course, intended to include both the visible and invisible portions of the spectrum and both non-collimated and collimated light.

The fluid in the reflective cells should be optically clear, and, of course, non-corrosive to the elements of the cell. It is normally desirable that it have its index of refraction substantially the same as the index of refraction of the other transparent materials in the cell. Possible, but not limiting, examples of fluids which may be utilized with glass transparent members include immersion oils, microscope slide oil, and silicone fluids.

While it has been indicated that the indices of refraction of the first transparent member, and the transparent plate, fluid, and transparent backing member of the cell should be substantially the same it should be understood that this sameness is primarily limited only by Snell's law. Therefore, the various abutting transparent materials should have a relationship as to their indices of refraction and the angle at which the light passes from one to the other such that total internal reflection is avoided.

In the preferred embodiments of this apparatus the first transparent member has been shown primarily as a right-angle prism. It should be understood that the mode of operation of this invention is valid for other configurations, such as, but not limited to, non-right-angle prisms, curved bodies, and other non-planar bodies. In a similar manner the transparent portions of the reflective cell are not strictly limited to a planar configuration.

While the invention has been particularly shown and described with reference to preferred embodiments thereof, it will be understood by those skilled in the art that various changes in the form and details may be made therein without departing from the spirit and scope of the invention.

What is claimed is:

1. A light deflector for controlling the position of a light beam, said deflector comprising:

a light transparent member composed of material having a relatively high index of refraction, said member positioned to receive and transmit said light beam, said member including a boundary surface normally in contact with space of relatively low index of refraction, said boundary surface oriented to intercept said light beam at an angle of incidence equal to or greater than the critical angle;

a light transmitting reflective cell positioned in juxtaposition to the light intercepting boundary surface of said light transparent member, said cell including as one wall portion a transparent plate composed of material having an index of refraction substantially the same as that of said light transparent member, said plate being constructed and positioned within the cell for movement from a first normal position separated from the light intercepting boundary surface of said light transparent member to a second position abutting said light intercepting boundary surface, said cell further including a reflective backing member spaced from said transparent plate, said reflective backing member having a reflecting surface positioned to intercept a ligth beam entering said cell through said transparent plate for reflecting the beam back toward the transparent plate, said plate and backing member defining a chamber within said cell, and transparent fluid means disposed in said chamber within said cell, said fluid means composed of material having an index of refraction substantially the same as that of said movable transparent plate; and means for actuating the transparent plate of said reflective cell between said first and second positions.

2. A light deflector as defined in claim 1 wherein said light transparent member is a prism.

3. A light reflector as defined in claim 1 wherein, within the reflective cell, the reflecting surface of said reflective backing member includes a reflective coating.

4. A light deflector as defined in claim 1 wherein, within the reflective cell, the reflective backing member is composed of transparent material having an index of refraction substantially the same as that of said transparent fluid, wherein the reflecting surface of said reflective backing member includes a boundary surface of said backing member normally in contact with space of relatively low index of refraction, said boundary oriented to intercept at an angle of incidence equal to or greater than the critical angle a beam of light entering said cell through said transparent plate.

5. A light deflector as defined in claim 1 wherein, within the reflective cell, the reflecting surface of said reflective backing member and the outer surface of said transparent plate are substantially parallel to one another.

6. A light deflector as defined in claim 1 wherein, within the reflective cell, the reflective backing member is movable within said cell toward and away from said transparent plate and wherein means for maintaining the chamber within said cell substantially filled with said transparent fluid is operatively associated with said chamber.

7. A light deflector as defined in claim 1, wherein said means for actuating the transparent plate of the reflective cell is piezo-electric material.

References Cited

UNITED STATES PATENTS

| | | |
|---|---|---|
| 2,565,514 | 8/1951 | Pajes. |
| 3,196,739 | 9/1965 | Wenking et al. |
| 3,198,070 | 8/1965 | Platzer. |
| 3,307,897 | 3/1967 | Lohmann. |
| 3,371,979 | 3/1968 | Catanzaro. |
| 3,424,516 | 1/1969 | Snyder. |
| 3,440,560 | 4/1969 | Pole. |
| 3,458,829 | 7/1969 | Pole et al. |
| 3,489,486 | 1/1970 | La Cierva. |

OTHER REFERENCES

Art of interest: "News in Focus," Laser Focus, vol. 5, No. 7, April 1969.

RONALD L. WIBERT, Primary Examiner

P. K. GODWIN, Assistant Examiner

U.S. Cl. X.R.

350—161, 286, 160